(12) United States Patent
Lin et al.

(10) Patent No.: US 11,987,027 B2
(45) Date of Patent: May 21, 2024

(54) RECYCLED THERMOPLASTIC POLYURETHANE MIXED LEATHER AND MANUFACTURING METHOD THEREOF

(71) Applicant: SAN FANG CHEMICAL INDUSTRY CO., LTD., Kaohsiung (TW)

(72) Inventors: Chih-Yi Lin, Kaohsiung (TW); Kuo-Kuang Cheng, Kaohsiung (TW); Li-Yuan Chen, Kaohsiung (TW); Yung-Yu Fu, Kaohsiung (TW)

(73) Assignee: SAN FANG CHEMICAL INDUSTRY CO., LTD., Kaohsiung (TW)

( * ) Notice: Subject to any disclaimer, the term of this patent is extended or adjusted under 35 U.S.C. 154(b) by 0 days.

(21) Appl. No.: 17/846,122

(22) Filed: Jun. 22, 2022

(65) Prior Publication Data
US 2023/0001681 A1   Jan. 5, 2023

(30) Foreign Application Priority Data
Jun. 30, 2021 (TW) ................................ 110124179

(51) Int. Cl.
| | | |
|---|---|---|
| *B32B 27/40* | (2006.01) | |
| *B29D 7/01* | (2006.01) | |
| *B29K 75/00* | (2006.01) | |
| *B29K 105/26* | (2006.01) | |
| *B32B 5/02* | (2006.01) | |
| *B32B 27/08* | (2006.01) | |
| *B32B 27/12* | (2006.01) | |

(52) U.S. Cl.
CPC .............. *B32B 27/40* (2013.01); *B29D 7/01* (2013.01); *B32B 5/028* (2013.01); *B32B 27/08* (2013.01); *B32B 27/12* (2013.01); *B29K 2075/00* (2013.01); *B29K 2105/26* (2013.01); *B32B 2262/0292* (2013.01); *B32B 2305/70* (2013.01)

(58) Field of Classification Search
None
See application file for complete search history.

(56) References Cited

U.S. PATENT DOCUMENTS

| | | | | |
|---|---|---|---|---|
| 2014/0079943 A1* | 3/2014 | Feng | ................... | D06N 3/0045 |
| | | | | 156/80 |
| 2016/0273159 A1* | 9/2016 | Feng | ...................... | B29C 48/49 |
| 2018/0148891 A1* | 5/2018 | Kim | ........................ | B32B 27/36 |
| 2020/0048829 A1* | 2/2020 | Lin | ...................... | D06N 3/0009 |

FOREIGN PATENT DOCUMENTS

| | | |
|---|---|---|
| CN | 102574303 A | 7/2012 |
| CN | 105583721 | 5/2016 |
| CN | 110857532 A | 3/2020 |
| CN | 110857534 A | 3/2020 |
| CN | 111212944 A | 5/2020 |
| CN | 112829420 A | 5/2021 |
| JP | H10244648 A | 9/1998 |
| KR | 100842218 B1 | 6/2008 |
| KR | 101450604 B1 * | 10/2014 |
| TW | 202007814 | 2/2020 |
| TW | 1711740 | 12/2020 |

OTHER PUBLICATIONS

Office action and search report issued on Nov. 4, 2022 for the corresponding Taiwan, R.O.C. Patent Application No. 110124179.
English summary of the office action and search report issued on Nov. 4, 2022 for the corresponding Taiwan, R.O.C. Patent Application No. 110124179.
Search report issued on Nov. 4, 2022 for the corresponding Taiwan, R.O.C. Patent Application No. 110124179.
English translation of the search report issued on Nov. 4, 2022 for the corresponding Taiwan, R.O.C. Patent Application No. 110124179.
English translation of CN111212944A.
China Patent Office, "Office Action" dated Jul. 26, 2023, China.
China Patent Office, "Search Report" dated Jul. 26, 2023, China.
English abstract translation of TW I711740.
English abstract translation of TW 202007814.
English abstract translation of CN 105583721.
Office action and search report for related Taiwan application 110124179.

* cited by examiner

*Primary Examiner* — Tamra L. Dicus
(74) *Attorney, Agent, or Firm* — WPAT, P.C

(57) ABSTRACT

The present disclosure relates to an innovative leather and a manufacturing method thereof. The innovative leather includes a TPU substrate, a TPU adhering layer, and a TPU surface layer. The TPU adhering layer is disposed on the TPU substrate. The TPU surface layer is disposed on the TPU adhering layer. All materials of the innovative leather of the present disclosure are the same TPU materials, thus the innovative leather of the present disclosure can be recycled after the innovative leather of the present disclosure is used. The innovative leather of the present disclosure has recycling benefit.

14 Claims, 4 Drawing Sheets

RECYCLED THERMOPLASTIC POLYURETHANE MIXED LEATHER AND MANUFACTURING METHOD THEREOF

FIELD

The disclosure relates to an innovative artificial leather and a manufacturing method thereof.

BACKGROUND

Conventional methods for manufacturing an artificial leather generally use various complicated processes, and some of the processes require the use of a solvent, which is harmful to the environment and does not meet requirements for environmental friendliness. Moreover, the artificial leather manufactured by the conventional methods is made of different raw materials, so that the conventional artificial leather cannot be recycled after being used.

SUMMARY OF THE INVENTION

In accordance with one aspect of the present disclosure, an innovative leather includes a TPU substrate, a TPU adhering layer, and a TPU surface layer. The TPU adhering layer is disposed on the TPU substrate. The TPU surface layer is disposed on the TPU adhering layer.

In accordance with one aspect of the present disclosure, an innovative leather includes a TPU fiber mesh layer having a weight of 200-600 $g/m^2$ and a density of 0.35-1.0 $g/cm^3$.

In accordance with one aspect of the present disclosure, a manufacturing method of an innovative leather includes: providing a TPU substrate; melt-blowing a TPU adhering layer onto the TPU substrate; melt-blowing a TPU surface layer onto the TPU adhering layer; and thermally compressing and bonding the TPU substrate, the TPU adhering layer and the TPU surface layer.

In accordance with one aspect of the present disclosure, a manufacturing method of an innovative leather includes: providing a carrier; and melt-blowing a fiber mesh layer onto the carrier.

BRIEF DESCRIPTION OF THE DRAWINGS

Aspects of the present disclosure are understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION OF THE INVENTION

Figure 1:
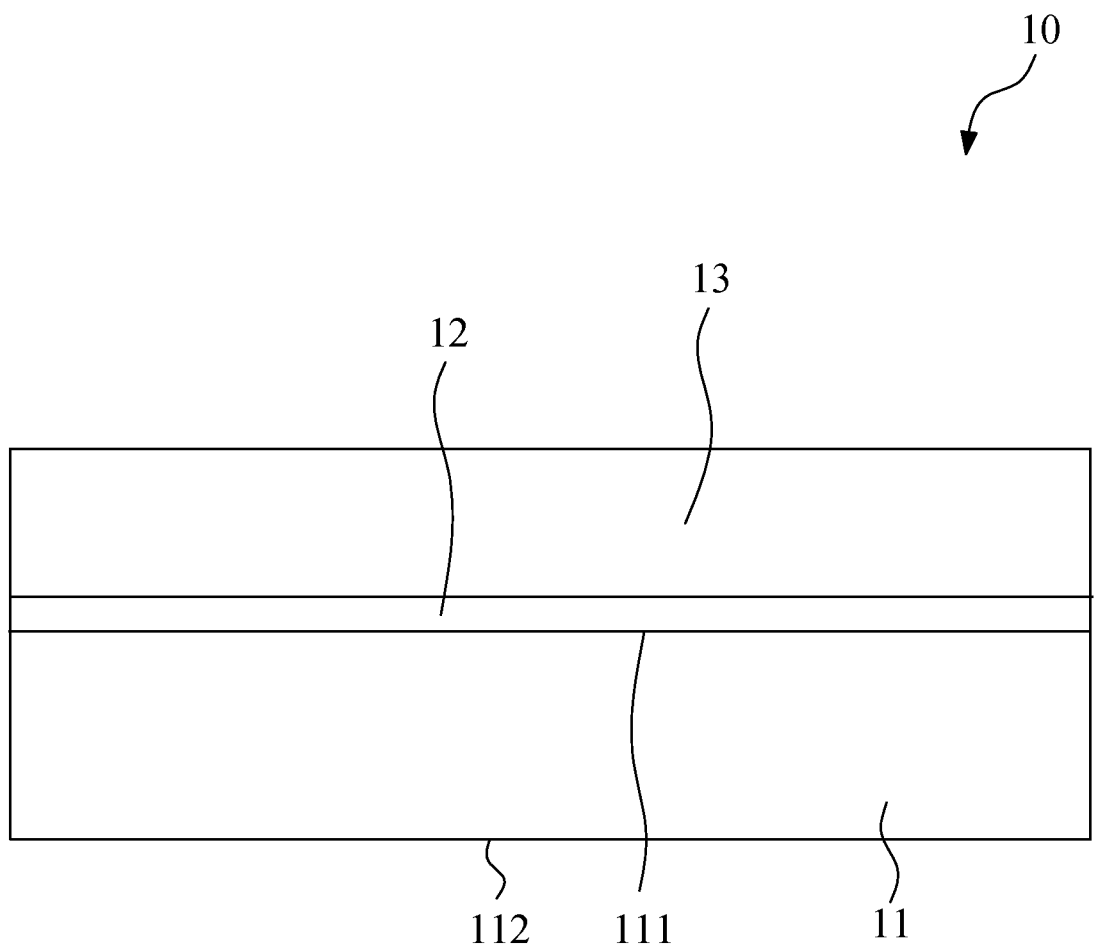
FIG. 1 is a schematic structural diagram showing an innovative leather according to an embodiment of the present disclosure.

It is to be understood that the following disclosure provides many different embodiments or examples, for implementing different features of various embodiments. Specific examples of components and arrangements are described below to simplify the present disclosure. The present disclosure may, however, be embodied in many different forms and should not be construed as being limited to the embodiments set forth herein; rather, these embodiments are provided so that this description will be thorough and complete, and will fully convey the present disclosure to those of ordinary skill in the art. It will be apparent, however, that one or more embodiments may be practiced without these specific details.

In addition, the present disclosure may repeat reference numerals and/or letters in the various examples. This repetition is for the purpose of simplicity and clarity and does not in itself dictate a relationship between the various embodiments and/or configurations discussed.

It will be understood that when an element is referred to as being "on" another element, it can be directly on the other element or intervening elements may be present. In contrast, when an element is referred to as being "directly on" another element, there are no intervening elements present.

It will be understood that singular forms "a", "an" and "the" are intended to include the plural forms as well, unless the context clearly indicates otherwise.

Unless otherwise defined, all terms (including technical and scientific terms) used herein have the same meaning as commonly understood by one of ordinary skill in the art to which this disclosure belongs. It will be further understood that terms; such as those defined in commonly used dictionaries, should be interpreted as having a meaning that is consistent with their meaning in the context of the relevant art and the present disclosure, and will not be interpreted in an idealized or overly formal sense unless expressly so defined herein.

FIG. 1 is a schematic structural diagram showing an innovative leather according to an embodiment of the present disclosure. In an embodiment, the leather 10 of the present disclosure includes a TPU substrate 11, a TPU adhering layer 12 and a TPU surface layer 13.

In an embodiment, the TPU substrate 11 has a first surface 111 and a second surface 112. The second surface 112 is opposite to the first surface 111. In an embodiment, the TPU substrate 11 is a 100% TPU base fabric, which is a 100% TPU fabric material. Therefore, the TPU substrate 11 is completely made of the TPU material.

In an embodiment, the TPU adhering layer 12 is disposed on the first surface 111 of the TPU substrate 11. The TPU adhering layer 12 has a weight of 100-300 $g/m^2$ and a density of 0.3-0.8 $g/cm^3$.

In an embodiment, the TPU surface layer 13 is disposed on the TPU adhering layer 12. The TPU surface layer 13 has a weight of 100-400 $g/m^2$ and a density of 0.5-1.0 $g/cm^3$.

In an embodiment, the leather 10 of the present disclosure includes the TPU substrate 11, the TPU adhering layer 12 and the TPU surface layer 13. The TPU substrate 11, the TPU adhering layer 12 and the TPU surface layer 13 are made of a single TPU material without other materials. Therefore, all materials of the leather 10 of the present disclosure are the same TPU materials, thus the leather 10 of the present disclosure can be recycled and granulated after the leather of the present disclosure is used. The leather of the present disclosure has environmental benefit. Moreover, the TPU recycled particles obtained after recycling and granulation may be added to the manufacturing process of the leather 10 of the present disclosure to further enhance environmental benefit, thereby saving the manufacturing cost.

In an embodiment, since the leather 10 of the present disclosure is made of the single TPU material, pores exist in the structure of the leather 10 of the present disclosure, so that the leather 10 of the present disclosure is breathable. Moreover, since the leather 10 of the present disclosure is made of the single TPU material, the overall plasticity of the leather of the present disclosure can be greatly increased.

In an embodiment, as described above, the TPU recycled particles obtained after recycling and granulation may be added to the manufacturing process of the leather 10 of the present disclosure. The TPU adhering layer 12 includes a first TPU material (not shown) and a TPU recycled material (not shown). The first TPU material and the TPU recycled material are mixed in a weight ratio of 70%:30% to 100%:0%.

In an embodiment, the TPU surface layer 13 includes a second TPU material (not shown) and a TPU recycled material (not shown). The second TPU material and the TPU recycled material are mixed in a weight ratio of 70%:30% to 100%:0%.

Figure 2:
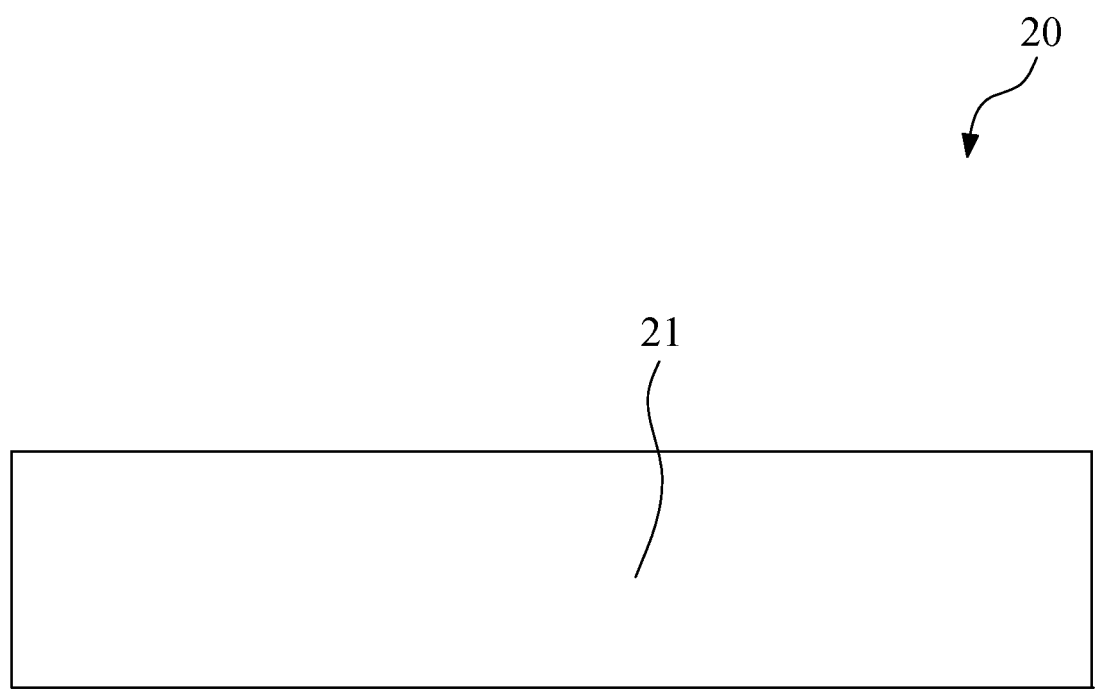
FIG. 2 is a schematic structural diagram showing an innovative leather according to another embodiment of the present disclosure.

FIG. 2 is a schematic structural diagram showing an innovative leather according to another embodiment of the present disclosure. The leather 20 of the present disclosure includes a TPU fiber mesh layer 21 having a weight of 200-600 g/m$^2$ and a density of 0.35-1.0 g/cm$^3$. The TPU fiber mesh layer 21 has a thickness of 0.3-1.3 mm.

In an embodiment, the leather 20 of the present disclosure is only made of the single TPU material without other materials. Therefore, the leather 20 of the present disclosure can be recycled and granulated after being used. The leather of the present disclosure has environmental benefit. Moreover, the TPU recycled particles obtained after recycling and granulation may be added to the manufacturing process of the leather 20 of the present disclosure to further enhance environmental benefit, thereby saving the manufacturing cost.

In an embodiment, the TPU fiber mesh layer 21 includes a second TPU material (not shown) and a TPU recycled material (not shown). The second TPU material and the TPU recycled material are mixed in a weight ratio of 70%:30% to 100%:0%.

In an embodiment, since the leather 20 of the present disclosure is only made of the single TPU material, pores exist in the structure of the leather 20 of the present disclosure, so that the leather 20 of the present disclosure is breathable. Moreover, since the leather 20 of the present disclosure is made of the single TPU material, the overall plasticity of the leather of the present disclosure can be greatly increased.

Figure 3:
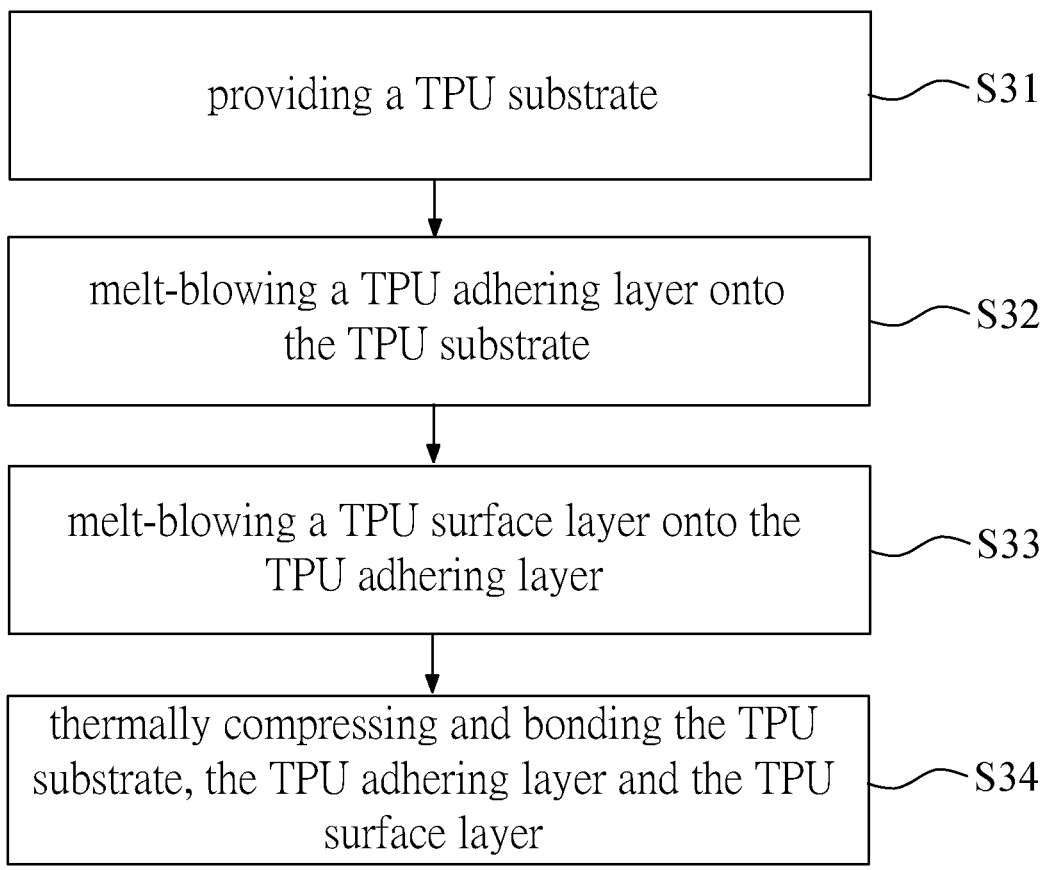
FIG. 3 shows a flowchart of a manufacturing method of an innovative leather according to an embodiment of the present disclosure.

FIG. 3 shows a flowchart of a manufacturing method of an innovative leather according to an embodiment of the present disclosure. With reference to FIG. 1 and FIG. 3, referring to step S31 first, a TPU substrate 11 is provided. The TPU substrate 11 has a first surface 11 and a second surface 112. The second surface 112 is opposite to the first surface 111. The TPU substrate 11 is a 100% TPU woven fabric.

Referring to step S32, a TPU adhering layer 12 is melt-blown onto the first surface 111 of the TPU substrate 11. In an embodiment, the step of melt-blowing the TPU adhering layer 12 further includes using first TPU particles (not shown) having a melting point of 80-130° C. The first TPU particles are low-melting TPU particles.

In an embodiment, the step of melt-blowing the TPU adhering layer 12 further includes using TPU recycled particles (not shown). The first TPU particles and the TPU recycled particles are mixed in a weight ratio of 70%:30% to 100%:0%. The TPU recycled particles may be obtained by recycling and granulating the leather of the present disclosure after use.

Referring to step S33, a TPU surface layer 13 is melt-blown onto the TPU adhering layer 12. The step of melt-blowing the TPU surface layer 13 further includes using second TPU particles (not shown) having a melting point of 140-170° C. The second TPU particles are high-melting TPU particles.

In an embodiment, the step of melt-blowing the TPU surface layer further includes using TPU recycled particles. The second TPU particles and the TPU recycled particles are mixed in a weight ratio of 70%:30% to 100%:0%. The TPU recycled particles may be obtained by recycling and granulating the leather of the present disclosure after use.

Referring to step S34, the TPU substrate 11, the TPU adhering layer 12 and the TPU surface layer 13 are thermally compressed and bonded. In the thermally compressing and bonding step, a temperature is 140° C.-170° C. In the thermally compressing and bonding step, since the temperature is higher than the melting point of the first TPU particles, the TPU adhering layer 12 may be melted and then bonded with the TPU substrate 11 and the TPU surface layer 13.

In an embodiment, after the thermally compressing and bonding step, the leather of the present disclosure may be subjected to surface thermoplastic processing, such that the leather of the present disclosure has different surface textures.

Therefore, according to the manufacturing method of the leather of the present disclosure, the TPU substrate 11, the TPU adhering layer 12 and the TPU surface layer 13 are made of the single TPU material, and thus prepared from the single raw material, so the process and material preparation of the manufacturing method of the leather of the present disclosure are simplified, which can enhance the manufacturing efficiency and lower the manufacturing cost. In addition, the leather 10 of the present disclosure can be recycled and granulated after being used. The leather of the present disclosure has environmental benefit. Moreover, the TPU recycled particles obtained after recycling and granulation may be added to the manufacturing process of the leather 10 of the present disclosure to further enhance environmental benefit, thereby saving the manufacturing cost.

Figure 4:
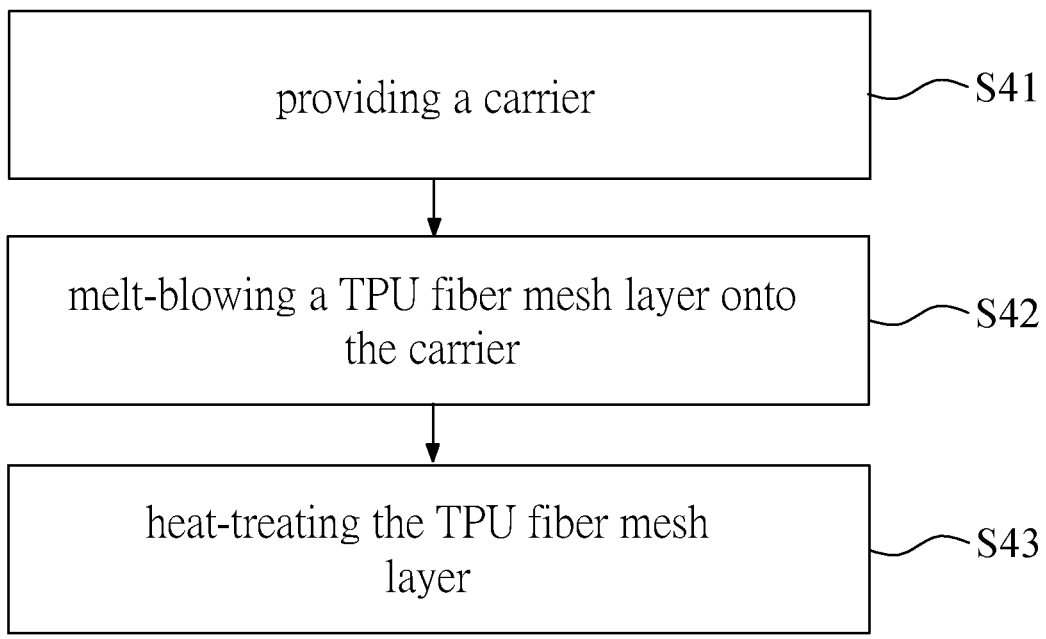
FIG. 4 shows a flowchart of a manufacturing method of an innovative leather according to another embodiment of the present disclosure.

FIG. 4 shows a flowchart of a manufacturing method of an innovative leather according to another embodiment of the present disclosure. With reference to FIG. 2 and FIG. 4, referring to step S41 first, a carrier (not shown) is provided.

Referring to step S42, a TPU fiber mesh layer 21 is melt-blown onto the carrier. In an embodiment, the step of melt-blowing the TPU fiber mesh layer 21 further includes using second TPU particles (not shown) having a melting point of 140-170° C. The second TPU particles are high-melting TPU particles.

In an embodiment, the step of melt-blowing the TPU fiber mesh layer 21 further includes using TPU recycled particles. The second TPU particles and the TPU recycled particles are mixed in a weight ratio of 70%:30% to 100%:0%. The TPU recycled particles may be obtained by recycling and granulating the leather of the present disclosure after use.

Referring to step S43, the TPU fiber mesh layer is heat-treated. In the heat-treatment step, the leather of the present disclosure may be subjected to surface thermoplastic heat treatment, such that the leather of the present disclosure has different surface textures. Alternatively, thermoplastic processing is not carried out, such that the leather of the present disclosure retains its fiber mesh appearance.

Therefore, according to the manufacturing method of the leather of the present disclosure, the TPU fiber mesh layer 21 is only made of the single TPU material, and thus prepared from the single raw material, so the process and material preparation of the manufacturing method of the leather of the present disclosure are simplified, which can enhance the manufacturing efficiency and lower the manufacturing cost. In addition, the leather 20 of the present disclosure can be recycled and granulated after being used. The leather of the present disclosure has environmental benefit. Moreover, the TPU recycled particles obtained after recycling and granulation may be added to the manufacturing process of the leather 20 of the present disclosure to further enhance environmental benefit, thereby saving the manufacturing cost.

Embodiment 1

A 100% TPU woven fabric was used as the TPU substrate 11.

First TPU particles having a melting point of 120° C. were used. The molten first TPU particles were melt-blown onto the TPU substrate 11 to form the TPU adhering layer 12. The TPU adhering layer 12 had a weight of 250 g/m$^2$ and a density of 0.5 g/cm$^3$.

Second TPU particles having a melting point of 160° C. were used. The molten second TPU particles were melt-blown onto the TPU adhering layer 12 to form the TPU surface layer 13. The TPU surface layer 13 had a weight of 200 g/m$^2$ and a density of 0.9 g/cm$^3$.

The laminated three-layer structure (the TPU substrate 11, the TPU adhering layer 12 and the TPU surface layer 13) was thermally compressed and bonded at a temperature of 140° C., such that the TPU adhering layer 12 was melted and bonded with the TPU substrate 11 and the TPU surface layer 13.

Then, the leather of the present disclosure may be subjected to surface thermoplastic processing, such that the leather of the present disclosure had different surface textures, thereby completing the all-TPU leather 10 of the present disclosure.

Embodiment 2

A carrier was used.

Second TPU particles having a melting point of 160° C. were used. The molten second TPU particles were melt-blown onto the carrier to form the TPU fiber mesh layer 21. The TPU fiber mesh layer 21 had a weight of 350 g/m$^2$, a density of 0.5 g/cm$^3$ and a thickness of 0.6 mm.

The TPU fiber mesh layer 21 was subjected to surface thermoplastic processing, such that the leather of the present disclosure had different surface textures, thereby completing the 100% TPU leather 20 of the present disclosure.

Embodiment 3

A 100% TPU woven fabric was used as the TPU substrate 11.

First TPU particles having a melting point of 120° C. and TPU recycled particles were used. The first TPU particles and the TPU recycled particles are mixed in a weight ratio of 85%:15%. The molten first TPU particles and TPU recycled particles were melt-blown onto the TPU substrate 11 to form the TPU adhering layer 12. The TPU adhering layer 12 had a weight of 250 g/m$^2$ and a density of 0.5 g/cm$^3$.

Second TPU particles having a melting point of 160° C. and TPU recycled particles were used. The second TPU particles and the TPU recycled particles are mixed in a weight ratio of 85%:15%. The molten second TPU particles and TPU recycled particles were melt-blown onto the TPU adhering layer 12 to form the TPU surface layer 13. The TPU surface layer 13 had a weight of 200 g/m$^2$ and a density of 0.9 g/cm$^3$.

The laminated three-layer structure (the TPU substrate 11, the TPU adhering layer 12 and the TPU surface layer 13) was thermally compressed and bonded at a temperature of 140° C., such that the TPU adhering layer 12 was melted and bonded with the TPU substrate 11 and the TPU surface layer 13.

Then, the leather of the present disclosure may be subjected to surface thermoplastic processing, such that the leather of the present disclosure had different surface textures, thereby completing the all-TPU leather 10 of the present disclosure.

Embodiment 4

A carrier was used.

Second TPU particles having a melting point of 160° C. and TPU recycled particles were used. The second TPU particles and the TPU recycled particles are mixed in a weight ratio of 85%:15%. The molten second TPU particles and TPU recycled particles were melt-blown onto the carrier to form the TPU fiber mesh layer 21. The TPU fiber mesh layer 21 had a weight of 350 g/m$^2$, a density of 0.5 g/cm$^3$ and a thickness of 0.6 mm.

The TPU fiber mesh layer 21 was subjected to surface thermoplastic processing, such that the leather of the present disclosure had different surface textures, thereby completing the 100% TPU leather 20 of the present disclosure.

Moreover, the scope of the present application is not intended to be limited to the particular embodiments of the process, machine, manufacture, and composition of matter, means, methods and steps described in the specification. As those skilled in the art will readily appreciate form the present disclosure, processes, machines, manufacture, compositions of matter, means, methods, or steps, presently existing or later to be developed, that perform substantially the same function or achieve substantially the same result as the corresponding embodiments described herein may be utilized in accordance with some embodiments of the present disclosure.

Accordingly, the appended claims are intended to include within their scope such processes, machines, manufacture, and compositions of matter, means, methods or steps. In addition, each claim constitutes a separate embodiment, and the combination of various claims and embodiments are within the scope of the disclosure.

What is claimed is:

1. An innovative leather, comprising:
    a thermoplastic polyurethane (TPU) substrate;
    a TPU adhering layer, disposed on the TPU substrate, wherein the TPU adhering layer comprises a first TPU material and a recycled TPU material, the first TPU material and the recycled TPU material are mixed in a weight ratio of 70%:30% to 85%:15%; and
    a TPU surface layer, disposed on the TPU adhering layer.
2. The innovative leather of claim 1, wherein the TPU adhering layer has a weight of 100-300 g/m2 and a density of 0.3-0.8 g/cm3.

3. The innovative leather of claim 1, wherein the TPU surface layer has a weight of 100-400 g/m2 and a density of 0.5-1.0 g/cm3.

4. The innovative leather of claim 1, wherein the TPU substrate is a 100% TPU base fabric.

5. The innovative leather of claim 1, wherein the TPU surface layer comprises a second TPU material and the recycled TPU material, the second TPU material and the recycled TPU material are mixed in a weight ratio of 70%:30% to 100%:0%.

6. The innovative leather of claim 5, wherein the second TPU material and the recycled TPU material are mixed in a weight ratio of 70%:30% to 85%:15%.

7. The innovative leather of claim 1, wherein the TPU substrate is a woven fabric.

8. The innovative leather of claim 1, wherein the TPU adhering layer is a melt-blown layer.

9. The innovative leather of claim 1, wherein the TPU surface layer is a melt-blown layer.

10. A manufacturing method of an innovative leather, comprising:
   providing a thermoplastic polyurethane (TPU) substrate;
   melt-blowing a TPU adhering layer onto the TPU substrate, which comprises using first TPU particles and recycled TPU particles, the first TPU particles and the recycled TPU particles are mixed in a weight ratio of 70%:30% to 85%:15%;
   melt-blowing a TPU surface layer onto the TPU adhering layer; and
   thermally compressing and bonding the TPU substrate, the TPU adhering layer and the TPU surface layer.

11. The manufacturing method of claim 10, wherein the first TPU particles have a melting point of 80-130° C.

12. The manufacturing method of claim 10, wherein the step of melt-blowing the TPU surface layer further comprises using second TPU particles having a melting point of 140-170° C.

13. The manufacturing method of claim 12, wherein the step of melt-blowing the TPU surface layer further comprises using the recycled TPU particles, the second TPU particles and the recycled TPU particles are mixed in a weight ratio of 70%:30% to 100%:0%.

14. The manufacturing method of claim 10, wherein the thermally compressing and bonding step is conducted at a temperature of 140° C.-170° C.

* * * * *